US012142855B2

(12) United States Patent
Park et al.

(10) Patent No.: US 12,142,855 B2
(45) Date of Patent: Nov. 12, 2024

(54) ANTENNA MODULE AND ELECTRONIC DEVICE COMPRISING SAME

(71) Applicant: LG INNOTEK CO., LTD., Seoul (KR)

(72) Inventors: Il Hee Park, Seoul (KR); Tae Gyeong Jang, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 53 days.

(21) Appl. No.: 17/904,667

(22) PCT Filed: Nov. 25, 2020

(86) PCT No.: PCT/KR2020/016784
§ 371 (c)(1),
(2) Date: Aug. 19, 2022

(87) PCT Pub. No.: WO2021/167211
PCT Pub. Date: Aug. 26, 2021

(65) Prior Publication Data

US 2023/0107359 A1 Apr. 6, 2023

(30) Foreign Application Priority Data

Feb. 19, 2020 (KR) ........................ 10-2020-0020623

(51) Int. Cl.
*H01Q 9/04* (2006.01)
*H01Q 21/00* (2006.01)

(52) U.S. Cl.
CPC ........... *H01Q 9/045* (2013.01); *H01Q 9/0407* (2013.01); *H01Q 21/00* (2013.01)

(58) Field of Classification Search
CPC ...... H01Q 9/045; H01Q 9/0407; H01Q 21/00; H01Q 5/378; H01Q 21/30
See application file for complete search history.

(56) References Cited

U.S. PATENT DOCUMENTS

| | | | |
|---|---|---|---|
| 9,620,849 | B2 | 4/2017 | Azad et al. |
| 2008/0106478 | A1 | 5/2008 | Hill |

(Continued)

FOREIGN PATENT DOCUMENTS

| | | | |
|---|---|---|---|
| CN | 105703076 | A | 6/2016 |
| CN | 105742790 | A | 7/2016 |

(Continued)

OTHER PUBLICATIONS

International Search Report dated Mar. 4, 2021 in International Application No. PCT/KR2020/016784.

(Continued)

*Primary Examiner* — Dieu Hien T Duong
(74) *Attorney, Agent, or Firm* — Saliwanchik, Lloyd & Eisenschenk

(57) ABSTRACT

An antenna module according to an embodiment of the present invention comprises: a first radiation part and a second radiation part to which a current is applied via at least one power supply line; a first coupling radiation part which is coupled to the first radiation part while being spaced a predetermined distance apart from the first radiation part; and a second coupling radiation part which is coupled to the second radiation part while being spaced a predetermined distance apart from the second radiation part, wherein the first radiation part and the second radiation part radiate signals in different frequency bands.

17 Claims, 16 Drawing Sheets

(56) References Cited

U.S. PATENT DOCUMENTS

| | | | | |
|---|---|---|---|---|
| 2010/0171675 | A1 | 7/2010 | Borja et al. | |
| 2015/0009074 | A1* | 1/2015 | Hsieh | H01Q 1/521 343/700 MS |
| 2018/0083340 | A1 | 3/2018 | Nishikawa et al. | |

FOREIGN PATENT DOCUMENTS

| | | | |
|---|---|---|---|
| KR | 10-1174739 | B1 | 8/2012 |
| KR | 10-2016-0060352 | A | 5/2016 |
| KR | 10-2016-0119501 | A | 10/2016 |

OTHER PUBLICATIONS

Supplementary European Search Report dated Feb. 12, 2024 in European Application No. 20920484.1.

Office Action dated Sep. 12, 2024 in Chinese Application No. 202080096719.3.

* cited by examiner (A)

(B)

(A)

(B)

(A)

(B)

(A)

(B)

ANTENNA MODULE AND ELECTRONIC DEVICE COMPRISING SAME

CROSS-REFERENCE TO RELATED APPLICATIONS

This application is the U.S. national stage application of International Patent Application No. PCT/KR2020/016784, filed Nov. 25, 2020, which claims the benefit under 35 U.S.C. § 119 of Korean Application No. 10-2020-0020623, filed Feb. 19, 2020, the disclosures of each of which are incorporated herein by reference in their entirety.

TECHNICAL FIELD

The present invention relates to an antenna module, and more particularly, to an antenna module capable of overcoming a radiation space restriction using a coupling radiation part and an electronic device including the same.

BACKGROUND ART

Recently, as the thickness of the TV is getting thinner, the space between the TV and the wall is gradually decreasing. As the TV is thinner and closer to the wall, in particular, when the TV is hung on the wall, spatial restrictions of radiation between the TV and the wall may occur. Accordingly, as the rear distance between the TV and the wireless (antenna) module that communicates with the outside and the TV's Meta Plate (metal) is reduced (existing: 15 mm → Slim TV: 5 mm), radiation deterioration may occur. In the existing 15 mm, the effect of the metal plate is insignificant, but there is a problem that radiation is not performed well because the radiation current is not formed smoothly at a distance of 5 mm. In addition, as the distance between the wireless module and the concrete wall is reduced (Existing: 15 mm → Slim TV: 5 mm), radiation degradation may also occur. In the past, even if the TV was used as a stand-type or a wall-mounted TV, a space for radiation was secured with a TV thickness of 50 mm or more, but as the TV thickness becomes less than 20 mm, the distance to the wall becomes only 3 mm, and thus, there is a problem in that radiation itself does not occur or most of the radiation field is absorbed by the wall.

DETAILED DESCRIPTION OF THE INVENTION

Technical Subject

The technical problem to be solved by the present invention is to provide an antenna module and a wireless module including the same capable of overcoming the radiation space constraint using a coupling radiation part.

The problems of the present invention are not limited to the problems mentioned above, and other problems not mentioned will be clearly understood by those skilled in the art from the following description.

Technical Solution

In order to solve the above technical problem, an antenna module according to an embodiment of the present invention comprises: a first radiation part and a second radiation part being applied with a current via at least one feeder line; a first coupling radiation part being coupled to the first radiation part while being spaced a predetermined distance apart from the first radiation part; and a second coupling radiation part being coupled to the second radiation part while being spaced a predetermined distance apart from the second radiation part, wherein the first radiation part and the second radiation part radiate signals in different frequency bands.

In addition, the first coupling radiation part and the second coupling radiation part may be formed to face in one direction.

In addition, the length of the radiation patch of the first radiation part may be 17.5 to 17.7 mm.

In addition, the length of the radiation patch of the second radiation part may be 17.2 to 17.4 mm.

In addition, the first coupling radiation part may be formed as a line patch having a predetermined width.

In addition, the length of the line patch may be 31.3 to 31.5 mm.

In addition, the line patch may be formed in a Meander line shape.

In addition, the second coupling radiation part may include: a square patch in a quadrangular shape; a first line patch being extended from one end of the square patch; and a second line patch being extended from the other end of the square patch.

In addition, at least one of the first line patch and the second line patch may be formed in a Meander line shape.

In addition, the square patch is formed to have a length of 21.6 to 21.8 mm and a width of 4.9 to 5.1 mm, the length of the first line patch is 24.25 to 24.45 mm, and the length of the second. line patch may be 18.75 to 18.95 mm.

In addition, the first coupling radiation part or the second coupling radiation part may be formed to have a length such that the level of isolation from different coupling radiation parts is equal to or less than a threshold value.

In addition, the first radiation part may cause resonance with the first coupling radiation part in at least one of a 2.4 to 2.5 GHz band or a 5.0 to 5.2 GHz band.

In addition, the second radiation part may cause resonance with the second coupling radiation part in a band of 2.4 to 2.5 GHz.

In addition, any one of the first radiation part and the second radiation part may be a radiation part for Wi-Fi, and the other one may be a radiation part for Bluetooth.

In addition, it includes a third radiation part to which a current is applied through at least one feeder line, wherein the third radiation part may be spaced apart from the first radiation part by a predetermined interval.

In addition, the radiation patch of the third radiation part may have a different lengthwise direction from the radiation patch of the first radiation part.

In addition, the first radiation part and the second radiation part may be formed on a substrate, and the first coupling radiation part and the second coupling radiation part may be formed on at least one outer side surface of a bracket covering the substrate.

In order to solve the above technical problem, an electronic device according to an embodiment of the present invention comprises: a substrate; a first radiation part and a second radiation part being connected to the substrate through at least one feeder line and being applied with a current; a bracket covering the substrate; a first coupling radiation part spaced apart from the first radiation part at a predetermined interval, being formed on at least one outer side surface of the bracket, and being coupled to the first radiation part; and a second coupling radiation part being spaced apart from the second radiation part at a predetermined interval, being formed on at least one outer side surface of the bracket, and coupled to the second radiation part Advantageous Effects According to embodiments of the present invention, it is possible to direct the radiation direction of a signal to a space where radiation is possible by using a coupling antenna. Through this, it is possible to overcome radiation degradation in a space where the radiation space is limited. Specifically, it is possible to overcome the radiation degradation by minimizing the effect of the rear distance between the metal plate and the antenna module, and to overcome the radiation degradation by minimizing the effect of the distance from the concrete wall.

The effect according to the invention is not limited by the contents exemplified above, and more various effects are included in the present specification.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under) ", the meaning of not only an upward direction but also a downward direction based on one component may be included.

Figure 1:
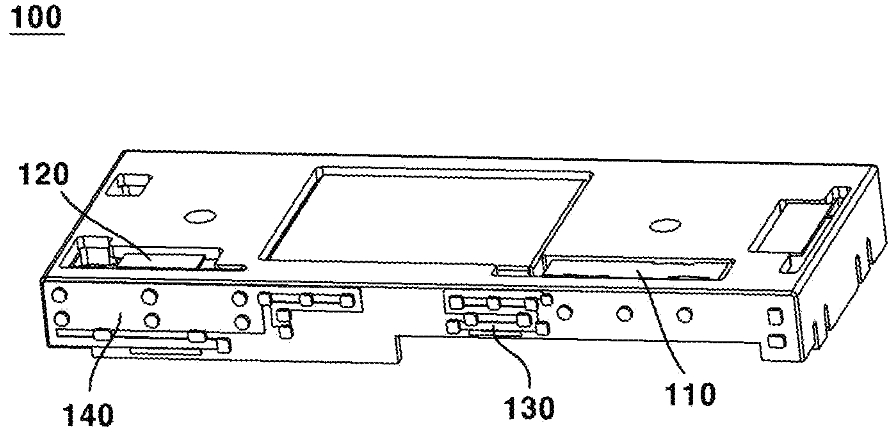
FIG. 1 illustrates an antenna module according to an embodiment of the present invention.

FIG. 1 illustrates an antenna module according to an embodiment of the present invention.

The antenna module 100 according to an embodiment of the present invention includes a first radiation part 110, a second radiation part 120, a first coupling radiation part 130, a second coupling radiation part 140, and may further include a substrate 210, a bracket 220, a third radiation part 212, and a communication module chip 211.

A current is applied to the first radiation part 110 and the second radiation part 120 through at least one feeder line, and the first radiation part 110 and the second radiation part 120 emit signals having different frequency bands.

More specifically, the first radiation part 110 and the second radiation part 120 are formed on the substrate 210, and a current may be applied through the substrate 210 and at least one feeder line. When a current is applied through the feeder line, the first radiation part 110 and the second radiation part 120 emit a signal having a predetermined frequency band according to the applied current to the outside. A frequency band of a signal radiated from the first radiation part 110 and a frequency band of a signal radiated from the second radiation part 120 may be different from each other. The specific shapes of the first radiation part 110 and the second radiation part 120 will be described in detail later.

The first coupling radiation part 130 is spaced apart from the first radiation part 110 at a predetermined interval, is coupled to the first radiation part 110 to radiate a signal, and the second coupling radiation part 140 is spaced apart from the second radiation part 120 at a predetermined interval, and is coupled to the second radiation part 120 to radiate a signal.

More specifically, the first coupling radiation part 130 is formed to be spaced apart from the first radiation part 110 by a preset interval. The first coupling radiation part 130 and the first radiation part 110 are not connected to each other, and since the first coupling radiation part 130 does not include a feeder line part, it may not be directly connected to a power source or a ground. The first coupling radiation part 130 may be formed to be insulated from other components. When a current is applied to the first radiation part 110, the first coupling radiation part 130 being spaced apart from each other at a predetermined interval is coupled to the first radiation part 110 to allow a current to flow, thereby emitting a signal. The signal being coupled to the first coupling radiation part 130 and radiated may vary depending on the shape of the first radiation part 110, the shape of the first coupling radiation part 130, and the distance between the first radiation part 110 and the first coupling radiation part 130.

The second coupling radiation part 140 is formed to be spaced apart from the second radiation part 120 by a preset interval. The second coupling radiation part 140 and the second radiation part 120 are not connected to each other, and since the second coupling radiation part 140 does not include a feeding part, it may not be directly connected to a power source or a ground. The second coupling radiation part 140 may be formed to be insulated from other components. When a current is applied to the second radiation part 120, the second coupling radiation part 140 being spaced apart from each other at a predetermined interval is coupled to the second radiation part 120 to allow a current to flow, and thereby emitting a signal. The signal being coupled to the second coupling radiation part 140 and radiated may vary depending on the shape of the second radiation part 120, the shape of the second coupling radiation part 140, and the distance between the second radiation part 120 and the second coupling radiation part 140. Specific shapes of the first coupling radiation part 130 and the second coupling radiation part 140 will be described in detail later.

A plurality of radiation parts having various frequency bands may be formed in one antenna module for various communication. In particular, for a near field communication, radiation parts for Wi-Fi, Bluetooth, GPS, and NFC may be required. In the case of a smart TV, Wi-Fi and Bluetooth are essential for data transmission and reception between the TV and a router or mobile terminal, and an antenna module being formed with radiation parts for the corresponding communication is required.

One of the first radiation part 110 and the second radiation part 120 may be a radiation part for Wi-Fi, and the other one may be a radiation part for Bluetooth. Or, it may be radiation for other communication, such as a radiation part for NFC. Here, the first radiation part 110 may be a radiation part for Wi-Fi. To this end, the first radiation part 110 may cause resonance with the first coupling radiation part 130 in at least one band among 2.4 to 2.5 GHz band or 5.0 to 5.2 GHz band which is a Wi-Fi frequency hand. The second radiation part 120 may be a radiation part for Bluetooth. To this end, the second radiation part 120 may cause resonance with the second coupling radiation part 140 in the band of 2.4 to 2.5 GHz which is a Bluetooth frequency.

Figure 2:
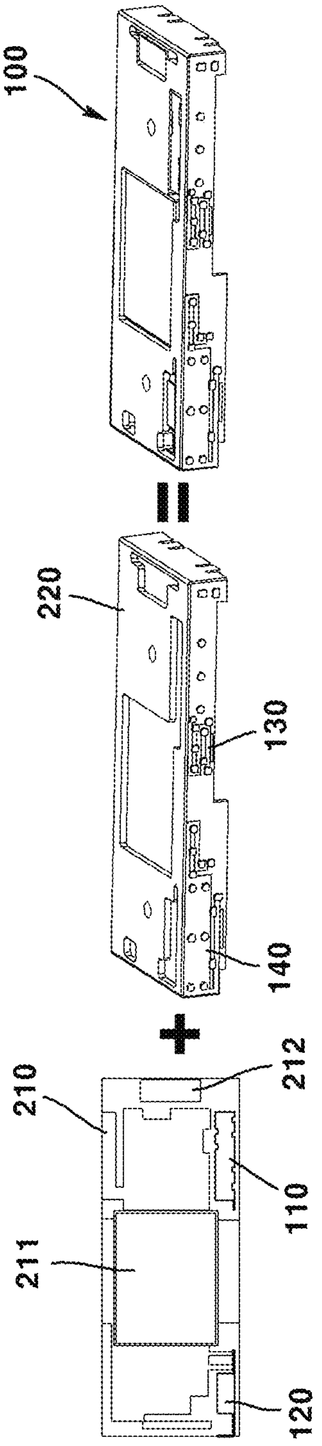
FIG. 2 is a diagram for explaining a form in which an antenna module according to an embodiment of the present invention is coupled.

As shown in FIG. 2, the antenna module 100 according to an embodiment of the present invention may include a substrate 210 and a bracket 220 covering the substrate 210. In forming the first radiation part 110, the second radiation part 120, the first coupling radiation part 130, and the second coupling radiation part 140, the antenna module 100 according to an embodiment of the present invention may form the first radiation part 110 and the second radiation part 120 on the substrate 210, and may form the first coupling radiation part 130 and the second coupling radiation part 140 on the bracket 220. By coupling the bracket 220 on which the first coupling radiation part 130 and the second coupling radiation part 140 are formed on the substrate 210 on which the first radiation part 110 and the second radiation part 120 are formed, an antenna module 100 may be formed. A communication module chip 211 or a third radiation part 212 may be further included on the substrate 210. The communication module chip 211 may be a chip including a processor for controlling a signal required for communication to be performed by the antenna module 100. The communication module chip 211 may perform various functions required for communication.

By forming the first radiation part 110 and the second radiation part 120 on the substrate 210, and forming the first coupling radiation part 130 and the second coupling radiation part 140 on the bracket 220, the first radiation part 110 and the first coupling radiation part 130 can be positioned to be spaced apart from each other at a predetermined interval, and so the second radiation part 120 and the second coupling radiation part 140 can be positioned to be spaced apart from each other at a predetermined interval as well. In addition, by forming the first coupling radiation part 130 and the second coupling radiation part on the bracket, it is possible to inhibit the first coupling radiation part 130 and the second coupling radiation part from being in contact with the first radiation part 110 and the second radiation part 120, and it can be formed so as not to be connected to power source or ground.

Forming the first coupling radiation part 130 and the second coupling radiation part 140 on the bracket so as to be spaced apart from the first radiation part 110 and the second radiation part 120 or not to be connected to a power source or ground corresponds to one exemplary embodiment, and as the first coupling radiation part 130 and the second coupling radiation part 140 are formed on a substrate other than the bracket 220 to be spaced apart from the first radiation part 110 and the second radiation part 120, it is natural that the first coupling radiation part 130 and the second coupling radiation part 140 may be formed in another form to be spaced apart from the first radiation part 110 and the second radiation part 120.

The first coupling radiation part 130 and the second coupling radiation part 140 may be formed in the same direction or different directions independently of the radiation direction of the first radiation part 110 or the second radiation part 120. As described previously, the first coupling radiation part 130 is coupled to the first radiation part 110 to radiate a signal, and the second coupling radiation part 140 is coupled to the second radiation part 120 to radiate a signal. At this time, a direction in which a signal is emitted may be formed according to a radiation direction of the first coupling radiation part 130 or the second coupling radiation part 140.

When the radiation direction of the first coupling radiation part 130 is different from that of the first radiation part 110, the signal being coupled and radiated from the first coupling radiation part 130 follows the radiation direction of the first coupling radiation part 130, so even if the signal is emitted from the first radiation part 110, it is possible to control the direction of a signal being coupled and emitted according to the corresponding signal. For example, by forming the first radiation part 110 to face the upper surface of the substrate, even if the radiation direction is formed toward the upper surface direction of the substrate, by forming the first coupling radiation part 130 in a direction perpendicular to the upper surface direction of the substrate, the direction of a signal being radiated from the first coupling radiation part 130 can be directed to a corresponding specific direction. Similarly, by forming the second coupling radiation part 140 in a direction different from that of the first radiation part 110, the radiation direction of the signal being radiated from the second coupling radiation part 140 can be directed in a specific direction. The first coupling radiation part 130 and the second coupling radiation part 140 may be formed on at least one outer side surface of the bracket 220 covering the substrate 210. The first radiation part 110 and the second radiation part 120 are formed on the substrate 210 to radiate a signal to the upper surface of the substrate 210, but the first coupling radiation part 130 and the second coupling radiation part 140 may be formed on at least one outer side surface of the bracket 220 to radiate a signal in a lateral direction. When only the first radiation part 110 and the second radiation part 120 emitting a signal to the upper surface of the substrate 210 are formed, radiation difficulties may arise when an obstacle or a wall is located in the direction of the upper surface of the substrate 210. At this time, by forming the first coupling radiation part 130 and the second coupling radiation part 140 that radiate signals in the lateral direction, it is possible to escape the radiation space constraint that may occur in the upper surface direction of the substrate. Or, the radiation direction of the first coupling radiation part 130 or the second coupling radiation part 140 may be formed in the same direction as the first radiation part 110 and the second radiation part 120. When the radiation direction of the first coupling radiation part 130 is formed to be the same as that of the first radiation part 110, a signal being coupled and radiated from the first coupling radiation part 130 is radiated in the same manner as the signal from the first radiation part 110, and the magnitude of the signal radiated in the corresponding direction can be increased.

The first coupling radiation part 130 and the second coupling radiation part 140 may be formed to face in one direction. When the first radiation part 110 and the second radiation part 120 are formed to radiate in a specific direction and an obstacle such as a wall is located in the radial direction, thereby generating a restriction in the radiation space, the first coupling radiation part 130 and the second coupling radiation part 140 can be formed to face a direction which is different from the radial directions of the first radiation part 110 and the second radiation part 120 and having no constraint in radiating space.

Hereinafter, specific embodiments of the shapes of the first radiation part 110, the second radiation part 120, the first coupling radiation part 130, and the second coupling radiation part 140 will be described.

Figure 3A:
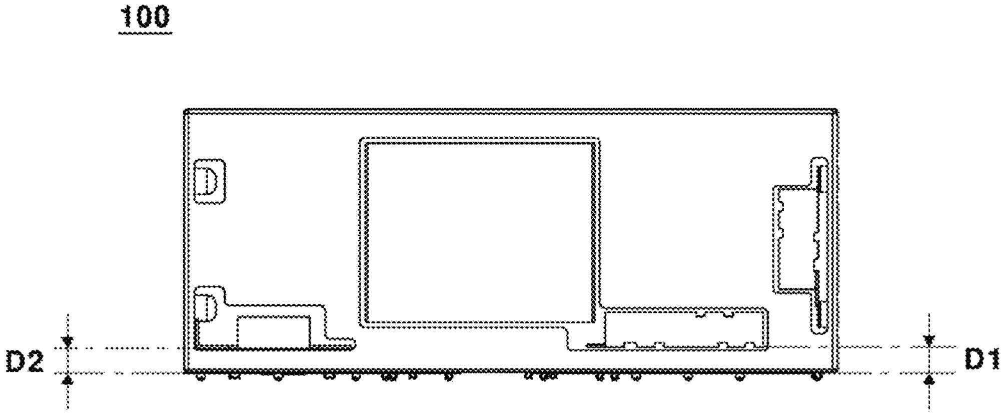
FIGS. 3 to 12 are diagrams for explaining an antenna module according to an embodiment of the present invention.

The first coupling radiation part 130 and the second coupling radiation part 140 are respectively coupled to the first radiation part 110 and the second radiation part 120 to radiate a signal, and the coupling characteristic formed between the first coupling radiation part 130 and the first radiation part 110 is, as shown in FIG. 3*a*, affected by the distance D1 between the first coupling radiation part 130 and the first radiation part 110. Similarly, the coupling characteristic formed between the second coupling radiation part 140 and the second radiation part 120 is affected by the distance D2 between the second coupling radiation part 140 and the second radiation part 120.

Figure 3B:
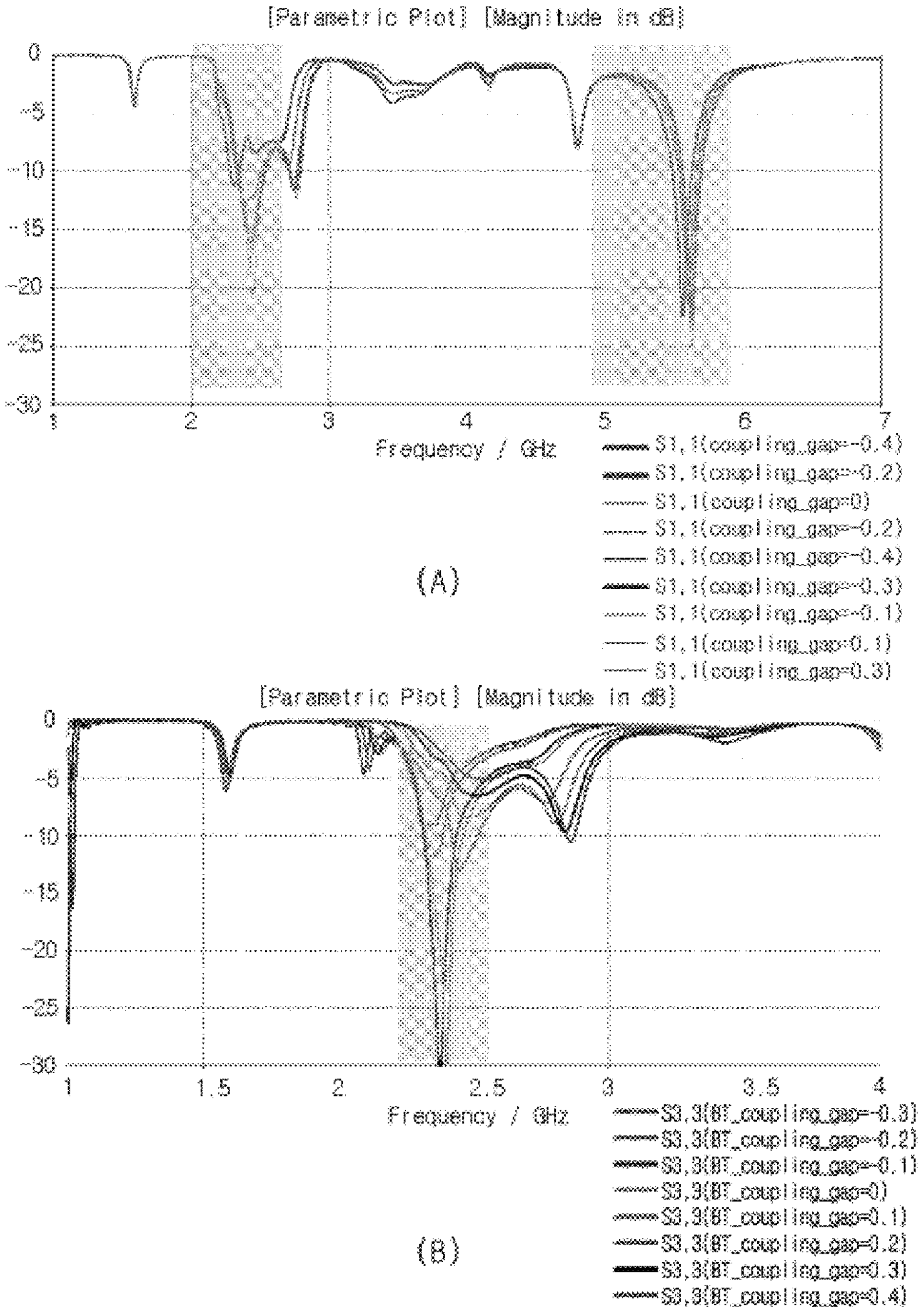

FIG. 3*b* is a graph showing the return loss according to D1 and D2. Here, the return loss refers to a ratio of how much reflection occurs when an electrical signal is emitted based on a specific radiation part, and the less the reflection, the electrical signal is radiated with a less loss. Therefore, the lower the Y-axis values on the graph, the better the radiation characteristic. Here, the variable range of D1 and D2 is 2.7 to 3.5 mm (unit: 0.1 mm). The return loss in the first radiation part 110 is the same as FIG. 3*b* (A), and the return loss in the second radiation part 120 is the same as FIG. 3*b* (B).

As a result of considering the return loss, when the interval between D1 and D2 is 2.7 to 2.9 mm, the resonance in the first radiation part 110 or the second radiation part 120 is distorted, the deterioration in the radiation characteristics can be confirmed, and the resonance occurring at 3.0 to 3.5 mm can be confirmed. The closer the distance between the two radiation parts, the better the coupling characteristics, and because the resonance is distorted at a certain distance or less, D1 and D2 can be set to a minimum distance of 3.0 mm in the resonance range. In consideration of the error, D1 and D2 may be set to 2.9 to 3.1 mm.

Figure 4A:
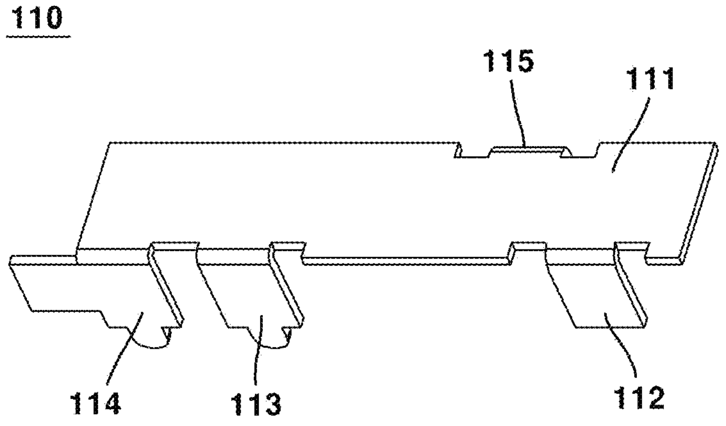
Figure 4B:
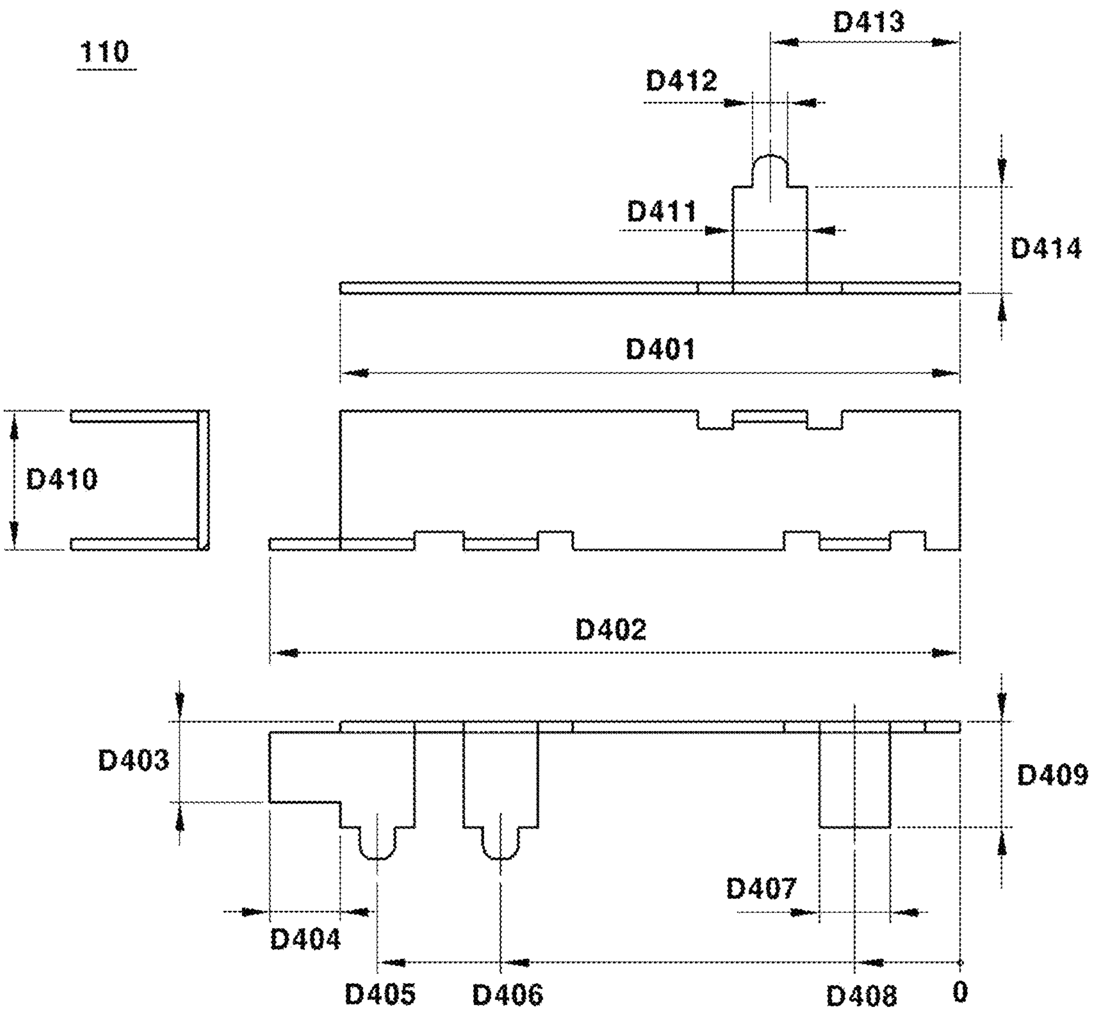

The first radiation part 110 may include a radiation patch, at least one feeding part, and at least one support part. As an embodiment, as shown in FIGS. 4*a* and 4*b*, the first radiation part 110 may include a radiation patch 111, at least one feeding part 112, and at least one of the support parts 113 to 115. It includes a radiation patch 111 radiating a signal, and may be connected to the substrate 210 through a feeding part 112 being applied with a current from the substrate 210. The radiation patch 111 is formed to be spaced apart from the substrate 210 at a predetermined interval, and includes support parts 113 to 115 for supporting the radiation patch 111 being formed to be spaced apart from the substrate 210. The components described as the feeding part and the support part may be configured as a feeding part or a support part depending on whether they are connected to a feeder line of the substrate 210. This may vary depending on the design of the radiation part.

The first radiation part 110 may be a PIFA antenna. The planar inverted F antenna (PIFA) is a planar plate inverted F antenna, and it refers to a planar plate antenna with a square patch plate having a smaller area placed on the ground plane of the flat plate as if letter F is turned upside down. It may comprise a ground plane, a radiation patch, a feeding part, and a shorting part (short-circuiting pin or shorting strip). The PIFA antenna serves as a radiating element while the patch resonates with the ground plane by feeding of a current, and bandwidth, gain, resonant frequency, and the like may be determined depending on the length, width, and height of the patch, the position of the feeder line and the position of the shorting pin, and the like. The first radiation part 110 is not limited to the PIFA antenna, and it is natural that it may be various antennas such as helical and monopole antennas, SMD antennas, and the like.

The characteristics of the first radiation part 110 are affected by the length D401, the width D410 of the radiation patch 111, the length D409 at which the radiation patch 111 is spaced apart from the substrate 210, and the like, in particular, it is greatly affected by the length D401 of the radiation patch 111.

Figure 5:
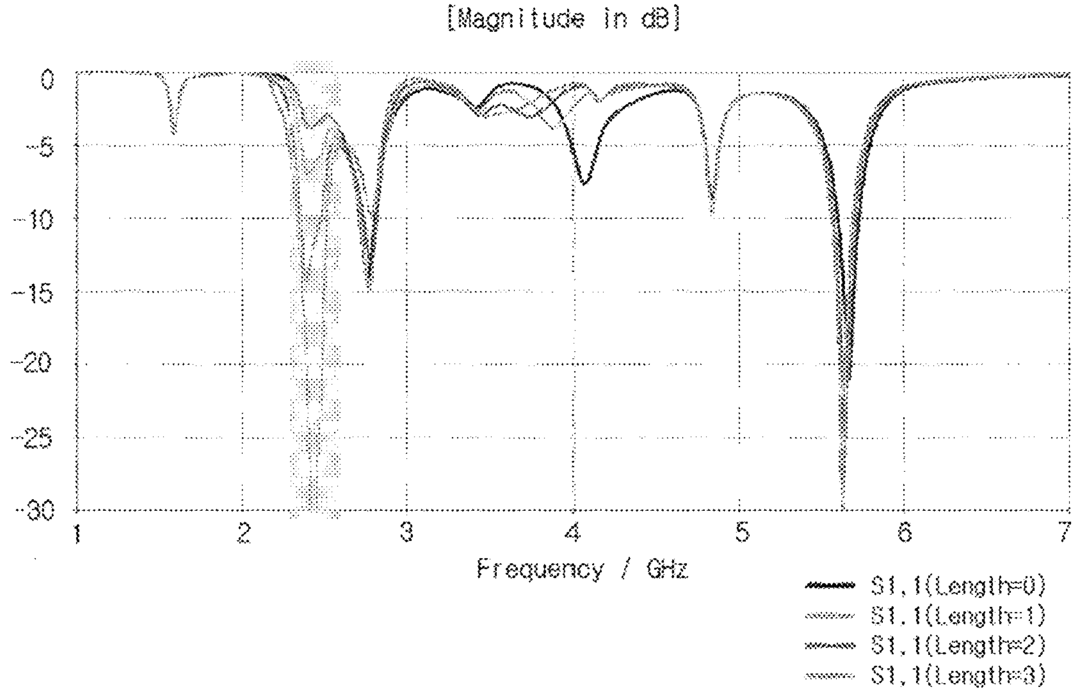

FIG. 5 is a graph showing the return loss according to the length D401 of the radiation patch 111, and through this, the length of the radiation patch 111 of the first coupling radiation part 130 and the first radiation part 110 in which resonance occurs most at the resonance frequency is derived, and the corresponding length may be set as the length of the radiation patch 111. Here, the first radiation part 110 determines that the length at which resonance with the first coupling radiation part 130 occurs most in the 2.4 to 2.5 GHz band as an optimal length, and may set the length of the first radiation part 110 as the corresponding length. By setting the variable range to 14.6 to 17.6 mm (unit length: 1 mm), it can be seen that the resonance frequency varies according to the length, and it can be seen that the length at which the resonance occurs most with the first coupling radiation part 130 is 17.6 mm. In consideration of the error, the length of the radiation patch 111 of the first radiation part 110 may be 17.5 to 17.7 mm.

When the length of the radiation patch 111 of the first radiation part 110 is 17.5 to 17.7 mm, each length of FIG. 4*b* may be the same as follows.

TABLE 1

| Reference No. | Length(mm) |
|---|---|
| D401 | 17.6 ± 0.1 |
| D402 | 19.6 ± 0.1 |
| D403 | 2.3 |
| D404 | 2.0 |
| D405 | 16.55 ± 0.1 |
| D406 | 13.05 ± 0.1 |
| D407 | 2.0 |
| D408 | 3.0 ± 0.1 |
| D409 | 3.0 ± 0.1 |
| D410 | 3.95 ± 0.1 |
| D411 | 2.1 |
| D412 | 1.0 ± 0.1 |
| D413 | 5.4 ± 0.1 |
| D414 | 3.0 ± 0.1 |

Each length in Table 1 indicates the length in one embodiment, and the length of the radiation patch 111 of the first radiation part 110 may vary at the same rate. In addition, it is natural that the shape or length of each component may vary depending on the design. The second radiation part 120 may include a radiation patch, at least one feeding part, and at least one support part. As an embodiment, as shown in FIGS. 5*a* and 5*b*, the second radiation part 120 may include radiation patches 121 to 123, at least one feeding part 124, and at least one support part 125. The radiation patch that emits the signal may be formed with a first radiation patch 121 parallel to the substrate 210, a second radiation patch 122 that is perpendicular to the substrate 210, and a third radiation patch 123 that is perpendicular to the substrate 210 and the first radiation patch 122. Here, the second radiation patch 122 and the third radiation patch 123 may be referred to as a feeding patch through which current flows by being connected to the feeding part 124. The radiation patches 121 to 123 may be connected to the substrate 210 through the feeding part 124 receiving current from the substrate 210. The feeding part 124 and the radiation patch 121 may be connected through the radiation patch 122, and the radiation patch 121 is formed to be spaced apart from the substrate 210 at a predetermined interval and may be supported by radiation patches 122 and 123 and a support part 125. The configuration described as a feeding part and the configuration described as a support part may be included in a feeding part or a support part depending on whether it is connected to the feeder line of the substrate 210. In addition, the radiation patch may also be formed in various shapes and may vary depending on the design of the radiation part.

The second radiation part 120 may also be a PIFA antenna. In addition, the second radiation part 120 is not limited to a PIFA antenna, and it is natural that it may be various antennas such as helical and monopole antennas and SMD antennas.

The characteristics of the second radiation part 120 are affected by the length D601 and width D605 of the radiation patch, the length D602 at which the radiation patch is spaced apart from the substrate 210, and the like, in particular, it will be greatly affected by the length D601 of the radiation patch.

Figure 7:
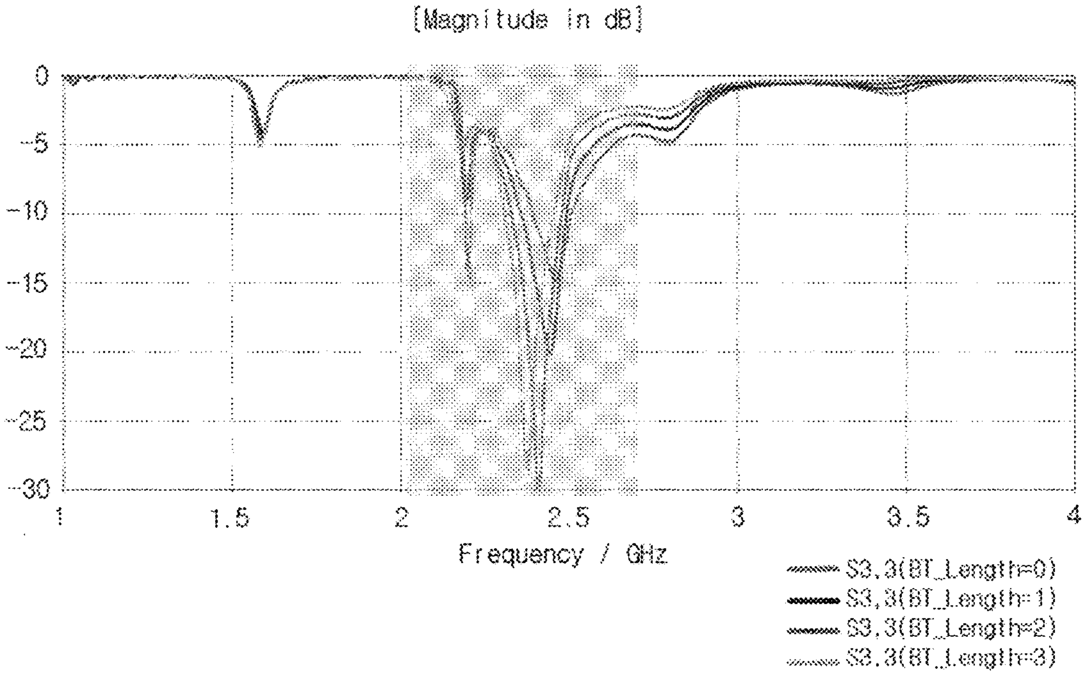

FIG. 7 is a graph showing the return loss according to the length D601 of the radiation patch, and through this, the length of the radiation patch of the second coupling radiation part 140 and the second radiation part 120 in which resonance occurs most at the resonant frequency is derived, and the corresponding length can be set as the length of the radiation patch. Here, the second radiation part 120 determines the length at which resonance with the second coupling radiation part 140 occurs most in the 2.4 to 2.5 GHz band as the optimal length, and may set the corresponding length as the length of the second radiation part 120. With a variable range of 15.3 to 18.3 mm (unit length: 1 mm), it can be seen that the resonance frequency varies according to the length, and it can be seen that the length at which the resonance occurs most with the second coupling radiation part 140 is 17.3 mm (Length=2). In consideration of the error, the length of the radiation patch of the second radiation part 120 may be 17.2 to 17.4 mm.

Figure 6A:
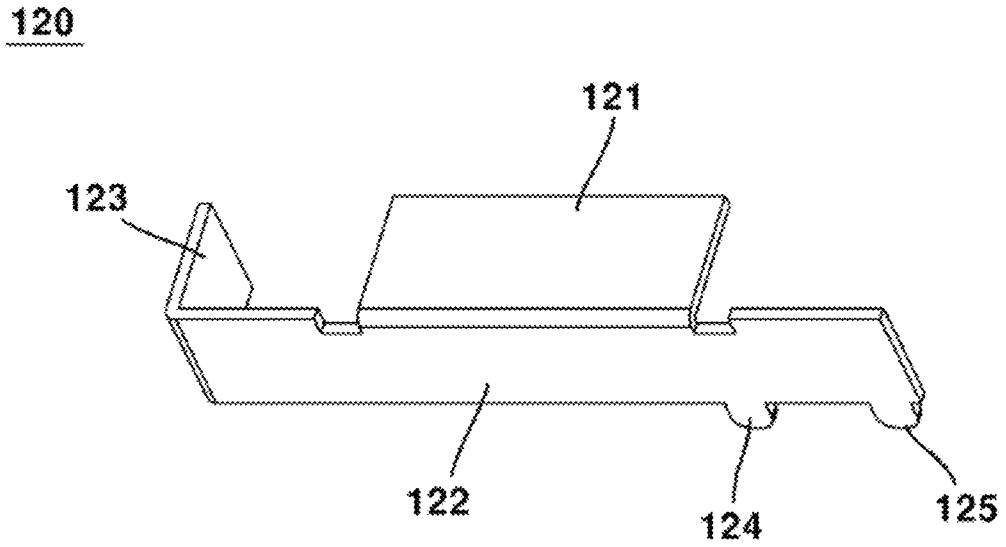
Figure 6B:
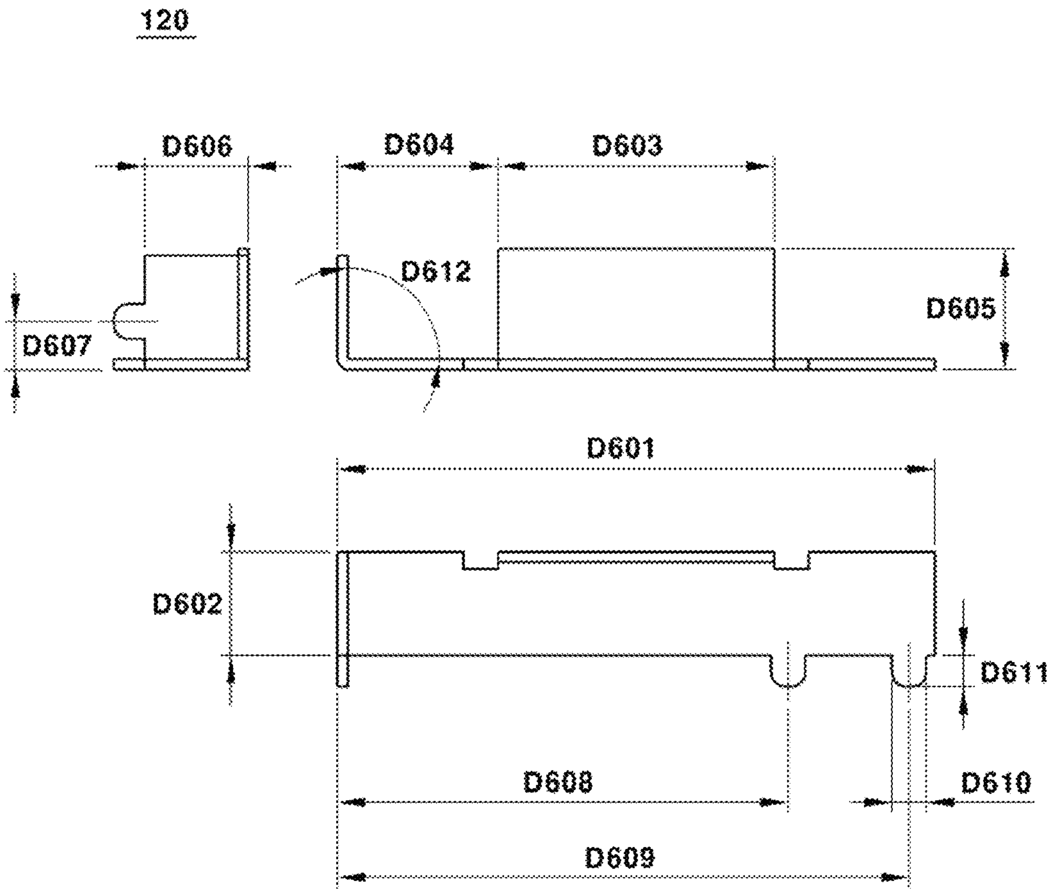

When the length of the radiation patch of the second radiation part 110 is 17.2 to 17.4 mm, each length of FIG. 6*b* may be the same as follows.

TABLE 2

| Reference No. | Length (mm) |
|---|---|
| D601 | 17.3 ± 0.1 |
| D602 | 3.0 ± 0.1 |
| D603 | 8.0 |
| D604 | 4.65 |
| D605 | 3.5 |
| D606 | 3.0 ± 0.1 |
| D607 | 1.4 ± 0.1 |
| D608 | 13.05 ± 0.1 |
| D609 | 16.55 ± 0.1 |
| D610 | 1.0 ± 0.1 |
| D611 | 0.9 ± 0.1 |
| D612 | 90 ± 1.5(°) |

Figure 8:
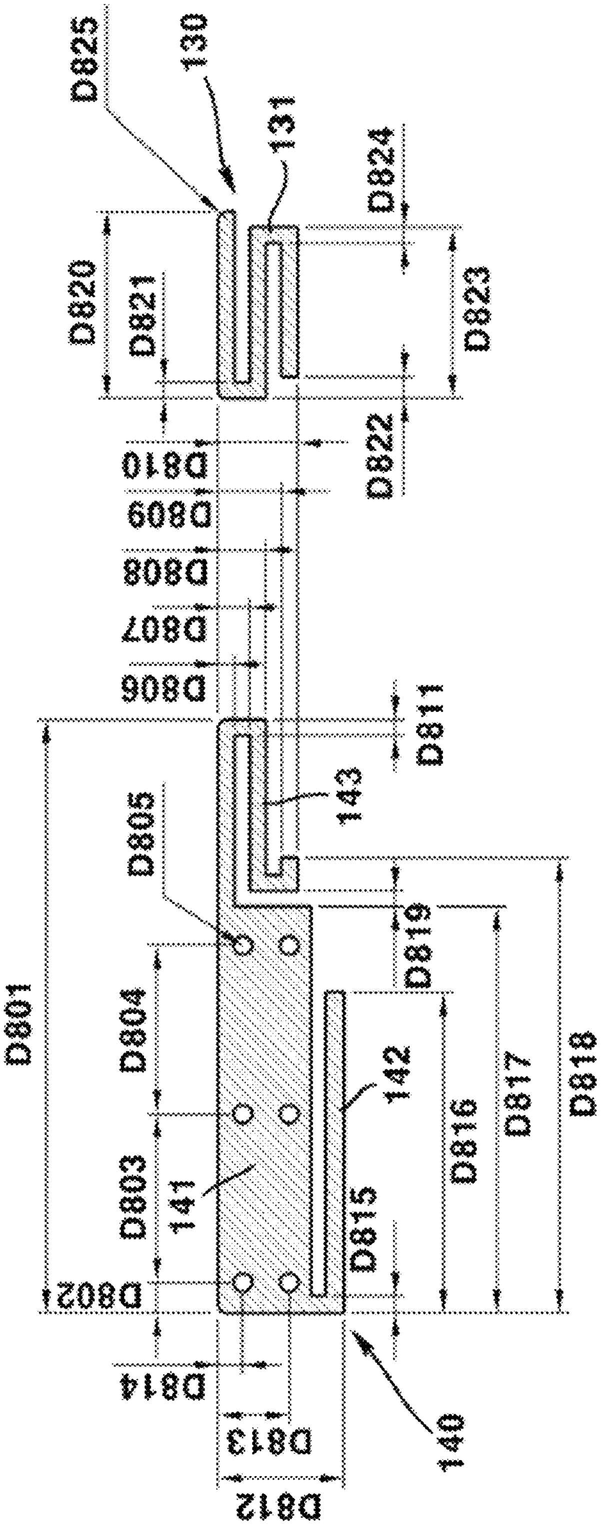
Figure 9:
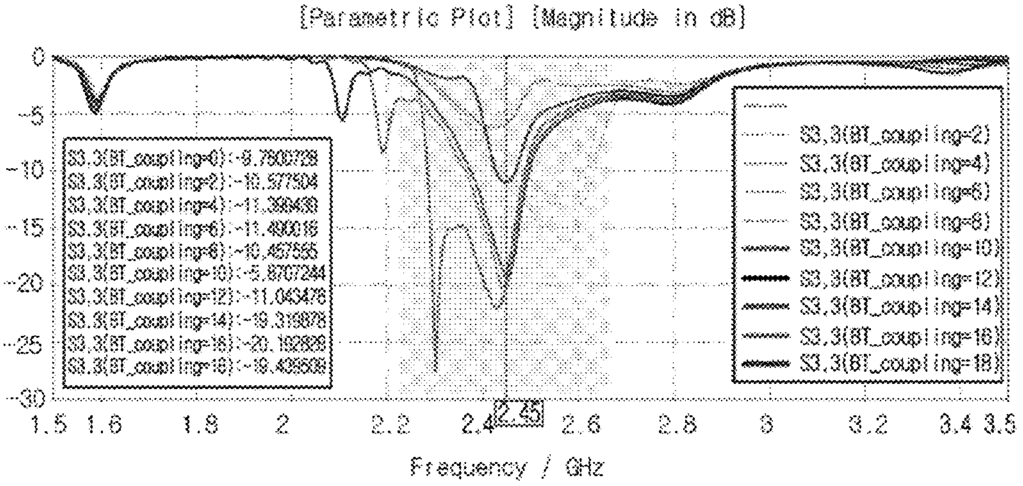

Each length and angle in Table 2 shows the length and angle in one embodiment, and it may vary in the same ratio according to the length of the radiation patch of the second radiation part 120. In addition, it is natural that the shape or length of each component may vary depending on the design. The first coupling radiation part 130, as shown in FIG. 8, may be formed as the line patch 131. The first coupling radiation part 130 may be formed as a line patch 131 in the shape of a line and may be coupled to the first radiation part 110 to cause resonance. At this time, the line patch 131 of the first coupling radiation part 130 may be formed in a Meander line shape. Here, the meander line shape means a curved shape or a meandering shape, as shown in FIG. 8, and may also be expressed as a zigzag shape. In order to form a line having a predetermined length in a narrow area, the line patch 131 may be formed in a Meander line shape. Through this, it is possible to form a small antenna module. FIG. 9 is a graph showing the return loss of the first radiation part 110 according to the total length of the line patch 131 of the first coupling radiation part 130, and through this, the length of the line patch 131 of the first coupling radiation part 110 at which the resonance with the first radiation part 110 in the resonance frequency occurs most is derived, and the corresponding length may be set as the length of the line patch 131. Here, the first coupling radiation part 130 determines the length at which the resonance occurs most with the first radiation part 110 in the 2.4 to 2.5 GHz band as the optimal length, and may set the length of the line patch 131 of the first coupling radiation part 130 as a corresponding length. With a variable range of 31.4 to 35.4 mm (unit length: 1 mm), it can be seen that the resonance frequency varies according to the length, and it can be seen that the length at which the resonance with the first radiation part 110 occurs most is 31.4 mm (Length=1). In consideration of the error, the length of the line patch of the first coupling radiation part 130 may be 31.3 to 31.5 mm.

The second coupling radiation part 140 may include a square patch and at least one line patch, and as shown in FIG. 8, it may be formed of a square patch 141 and line patches 142 and 143. The square patch 141 is formed in a square shape, and the first line patch 142 is extended from one end of the square patch 141, and the second line patch 143 may be formed by being extended from the other end of the square patch 141. At least one of the first line patch 142 and the second line patch 143 may be formed in a Meander line shape.

Figure 10:
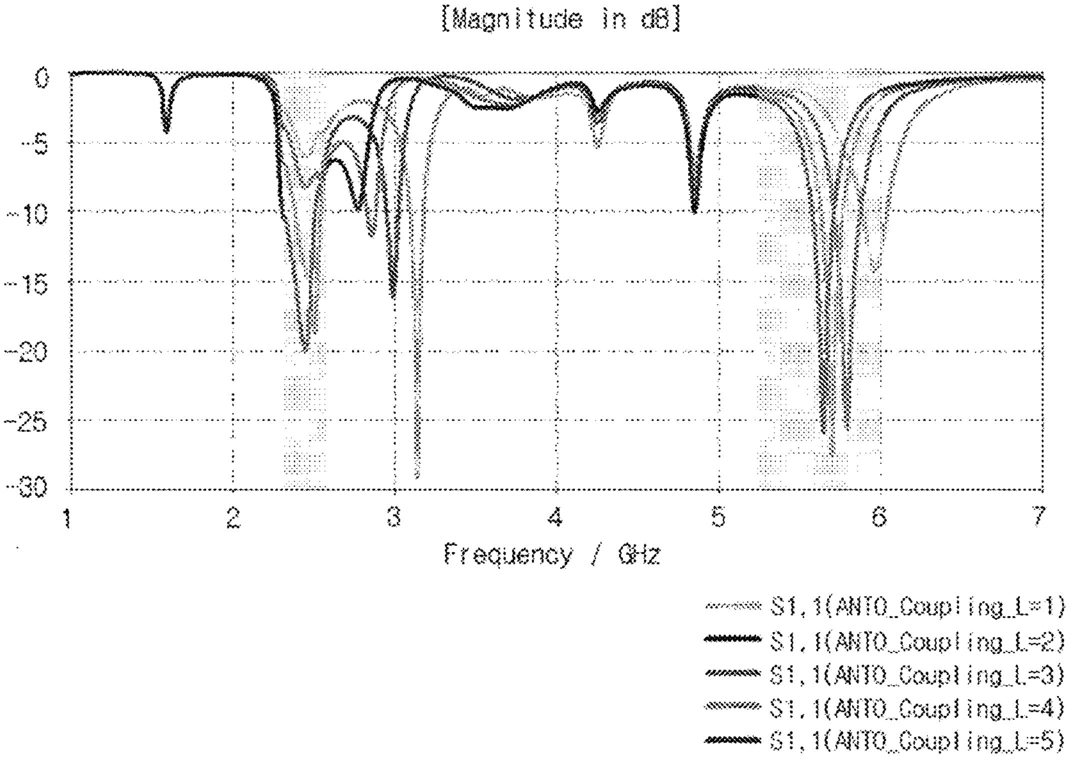

FIG. 10 is a graph showing the return loss of the second radiation part 120 according to the total length of the second line patch 143 of the second coupling radiation part 140, and through this, the length of the line patch of the second coupling radiation part 140 at which the resonance with the second radiation part 120 in the resonant frequency occurs most is derived, and the corresponding length can be set as the length of the line patch. Here, the second coupling radiation part 140 may determine the length at which resonance occurs most with the second radiation part 120 in the 2.4 to 2.5 GHz band as the optimal length, and the length of the second line patch 143 of the second coupling radiation part 140 may be set as the corresponding length. Here, the square patch 141 is formed to have a length of 21.7 mm and a width of 5 mm, the length of the first line patch 142 is 24.35 mm, and by setting the variable range of the length of the second line patch 143 to be 17.85 to 35.85 mm (unit length: 2 mm), it can be seen that the resonance frequency varies according to the length, and it can be seen that the length at which the resonance with the second radiation part 120 occurs most is 18.85 mm. In consideration of the error, the square patch 141 of the second coupling radiation part 140 is formed to have a length of 21.6 to 21.8 mm and a width of 4.9 to 5.1 mm, the length of the first line patch 142 is 24.25 to 24.45 mm, and the length of the second line patch 143 may be 18.75 to 18.95 mm.

The length of the line patch 131 of the first coupling radiation part 130 is 31.3 to 31.5 mm, the square patch 141 of the second coupling radiation part 140 is formed to have a length of 21.6 to 21.8 mm and a width of 4.9 to 5.1 mm, the length of the first line patch 142 is 24.25 to 24.45 mm, and when the length of the second line patch 143 is 18.75 to 18.95 mm, each length in FIG. 8 may be the same as follows.

TABLE 3

| Reference No. | Length (mm) |
|---|---|
| D801 | 31.7 |
| D802 | 1.63 |
| D803 | 9.0 |
| D804 | 9.0 |
| D805 | 1.0 |
| D806 | 0.85 |
| D807 | 1.7 |
| D808 | 2.55 |
| D809 | 3.4 |
| D810 | 4.25 |
| D811 | 0.85 |
| D812 | 6.75 |
| D813 | 3.8 |
| D814 | 1.3 |
| D815 | 0.9 |
| D816 | 17.1 |
| D817 | 21.7 |
| D818 | 24.3 |
| D819 | 0.85 |
| D820 | 10.0 |
| D821 | 0.85 |
| D822 | 1.15 |
| D823 | 9.15 |

TABLE 3-continued

| Reference No. | Length (mm) |
|---|---|
| D824 | 0.85 |
| D825 | R0.4 |

Figure 11:
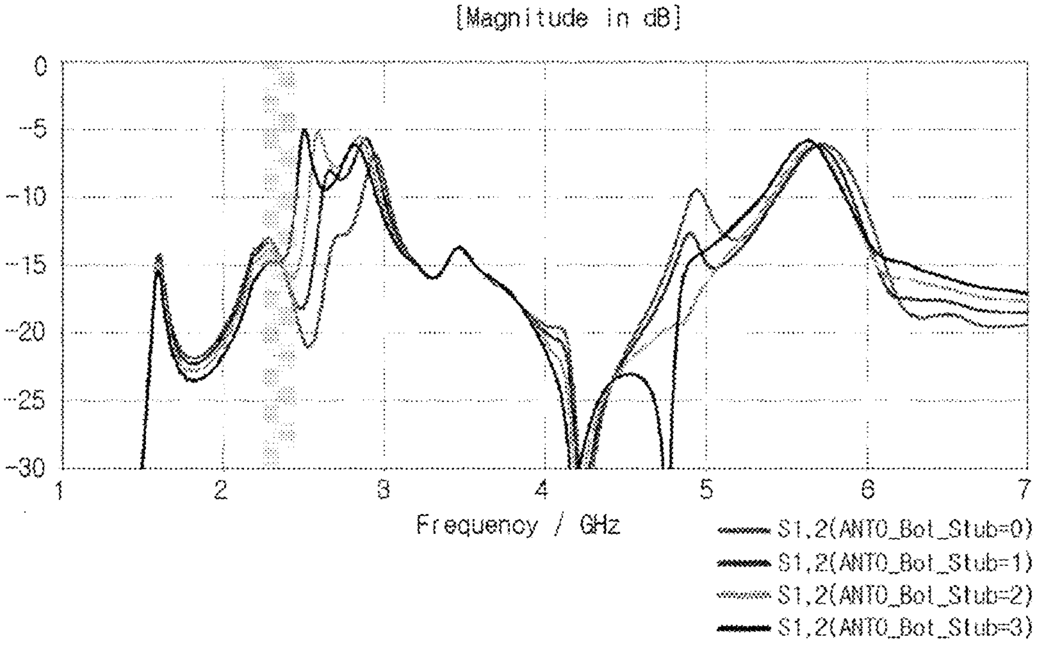

Each length in Table 3 represents the length in one embodiment and may vary in the same proportion depending on the length of the line patch 131 of the first coupling radiation part 130 or the length of the second line patch 143 of the second coupling radiation part. In addition, it is natural that the shape or length of each component may vary depending on the design. The first coupling radiation part 130 or the second coupling radiation part 140 may be formed to have a length at which the level of isolation with the different coupling radiation parts becomes below the threshold. The first coupling radiation part 130 is coupled to the first radiation part 110, the second coupling radiation part 140 is coupled to the second radiation part 120, and when both coupling radiation parts are coupled, they may affect each other. Therefore, the level of isolation with the different coupling radiation parts may be formed in a length such that the level of isolation is less than or equal to a threshold value so as not to affect each other. Here, the level of isolation indicates an effect between two radiation parts, and means a rate at which a signal emitted from one radiation part enters another radiation part, and the lower it is, the higher the radiation characteristic is. FIG. 11 is a graph showing the level of isolation, and as described previously, the length of the line patch 131 of the first coupling radiation part 130 is 31.3 to 31.5 mm, the square patch 141 of the second coupling radiation part 140 is formed to have a length of 21.6 to 21.8 mm and a width of 4.9 to 5.1 mm, the length of the first line patch 142 is 24.25 to 24.45 mm, and it can be seen that the level of isolation is low when the length of the second line patch 143 is 18.75 to 18.95 mm.

The antenna module 100 according to an embodiment of the present invention may further include other radiation parts in addition to the first radiation part 110 and the second radiation part 120. When the first radiation part 110 is a radiation part for Wi-Fi, a third radiation part 212 may be further included in order to increase the radiation characteristics of the Wi-Fi signal. The number and shape of radiation parts formed in the antenna module 100 may vary depending on the design of the antenna module.

The antenna module 100 according to an embodiment of the present invention may include a third radiation part 212 to which current is applied through at least one feeder line, and the third radiation part 212 may be formed to be spaced apart from the first radiation part 110 at a predetermined interval. The radiation patch of the third radiation part 212 may have a different lengthwise direction from the radiation patch of the first radiation part 110. As shown in FIG. 2, a third radiation part 212 in addition to the first radiation part 110 and the second radiation part 120 may be formed on the substrate 210, and at this time, the third radiation part 212 may be a radiation part for Wi-Fi together with the first radiation part 110. In forming the third radiation part 212, it may be formed to be spaced apart from the first radiation part 110 at a predetermined interval, and it may be formed so that the lengthwise directions of the radiation patches are different from each other to reduce interference between radiation parts.

Figure 12A:
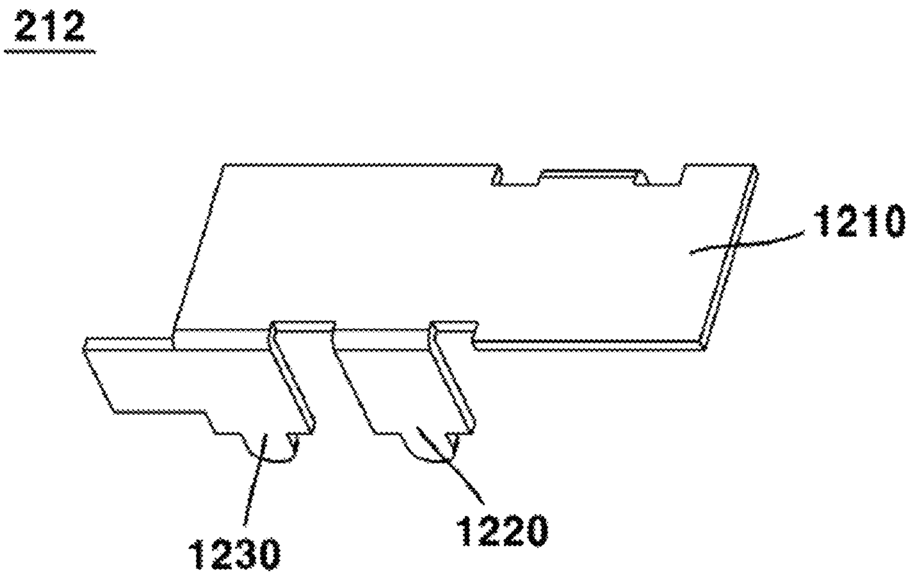
Figure 12B:
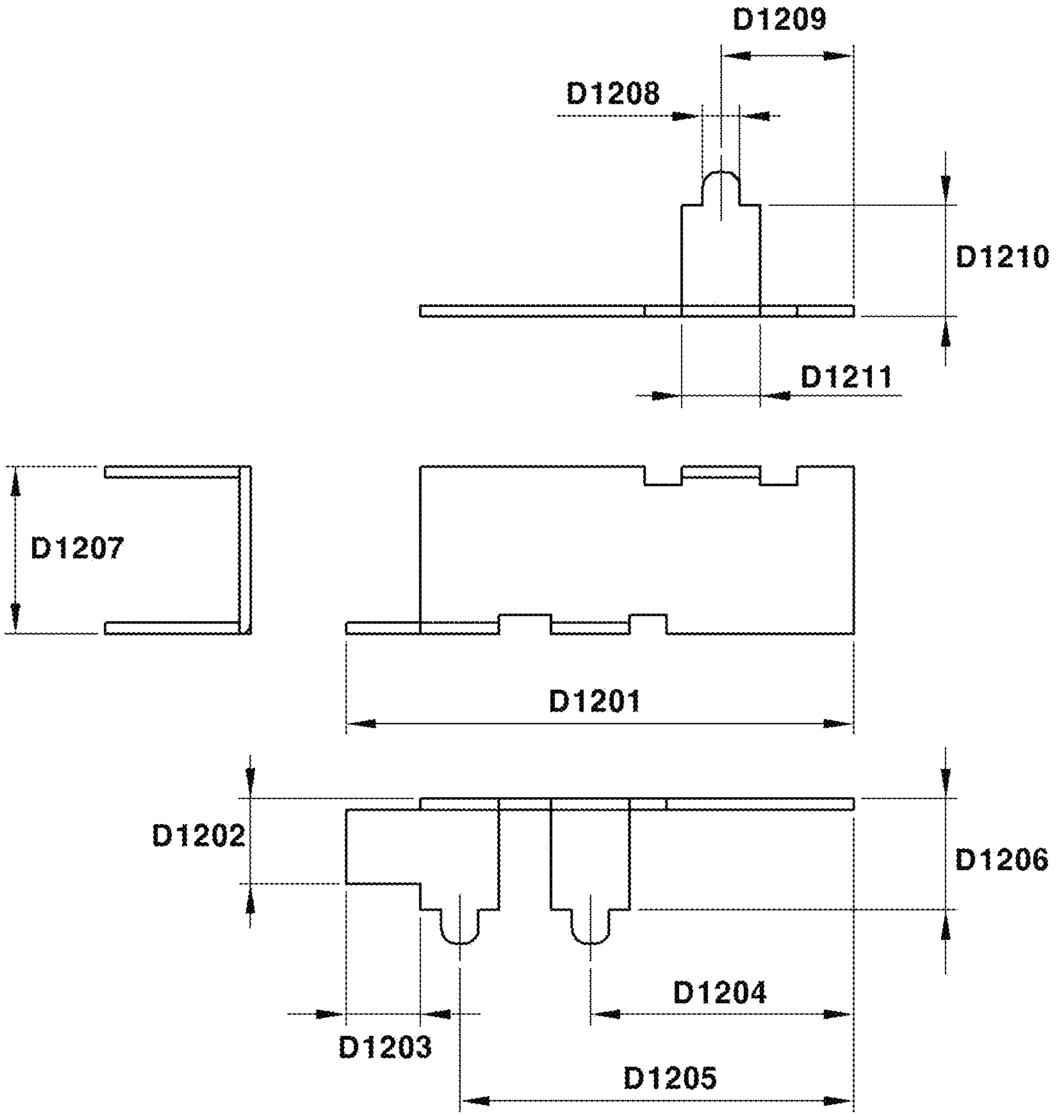

The third radiation part 212 may include a radiation patch, at least one feeding part, and at least one support part. As an embodiment, as shown in FIGS. 12*a* and 12*b*, the third radiation part 212 may include a radiation patch 1210, at least one feeding part 1220, and at least one of the support parts 1230 and 1240. It includes a radiation patch 1210 radiating a signal, and may be connected to the substrate 210 through a feeding part 1220 being applied with a current from the substrate 210. The radiation patch 1210 is formed to be spaced apart from the substrate 210 at a predetermined interval, and includes support parts 1230 and 1240 for supporting the radiation patch 1210 being formed to be spaced apart from the substrate 210. The configuration described as the feeding part and the configuration described as the support part may be configured as a feeding part or a support part depending on whether or not they are connected to the feeder line of the substrate. This may vary depending on the design of the radiation part.

The third radiation part 212 may be a PIFA antenna, and may be various antennas such as helical and monopole antennas, SMD antennas, and the like. Each length of FIG. 12*b* of the third radiation part 212 may be the same as follows.

TABLE 4

| Reference No. | Length (mm) |
|---|---|
| D1201 | 13.6 ± 0.1 |
| D1202 | 2.3 |
| D1203 | 2.0 |
| D1204 | 7.05 ± 0.1 |
| D1205 | 10.55 ± 0.1 |
| D1206 | 3.0 ± 0.1 |
| D1207 | 4.5 ± 0.1 |
| D1208 | 1.0 ± 0.1 |
| D1209 | 3.55 ± 0.1 |
| D1210 | 3.0 ± 0.1 |
| D1211 | 2.1 |

Each length in Table 4 represents a length in one embodiment, and it is natural that the shape or length of each component may vary depending on the design. FIGS. 13A to 14B are diagrams for explaining radiation characteristics of an antenna module according to an embodiment of the present invention. FIGS. 13A to 14B may be radiation characteristics being measured in the same environment as in FIG. 15. FIG. 15 illustrates a case in which the antenna module 100 is positioned between a metal plate 1510 and a wall surface 1520, and a radiation part being formed on the substrate may be formed to be facing the wall surface 1520. In the case of an antenna including a coupling antenna, the coupling antenna may be formed on the side surface instead of the wall surface 1520.

Figure 13A:
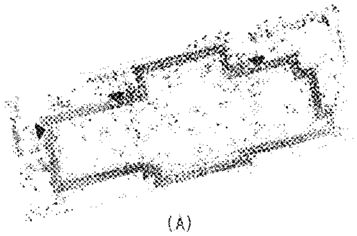
FIGS. 13 to 14 are diagrams for explaining radiation characteristics of an antenna module according to an embodiment of the present invention.
Figure 13A:
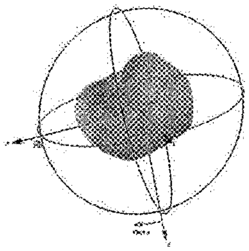
Figure 13B:
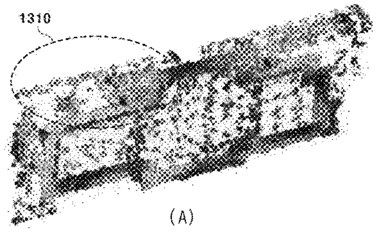
Figure 13B:
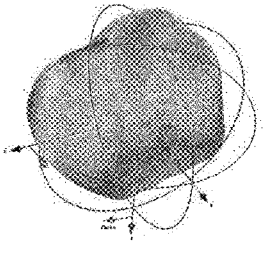

FIG. 13*a* is a flow of current being measured at 2.4 GHz when a coupling antenna is not included, and it can be seen that radiation is not performed well because the effect of the bottom metal plate 1510 is large due to the low rear distance. In contrast, FIG. 13*b* is a flow of current measured at 2.4 GHz when the first coupling antenna and the second coupling antenna are included, and when compared to FIG. 13*a*, it can be seen that a current flow is formed in the side surface, that is, in the region 1310 where the coupling antenna is formed. That is, by inducing a radiation current in the coupling antenna by using a coupling antenna, it can be seen that the coupling antenna is radiated smoothly toward the front part (the space between the metal plate and the wall surface).

Figure 14A:
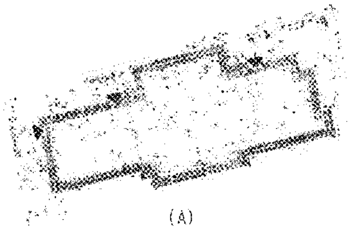
Figure 14A:
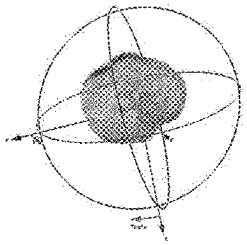
Figure 14B:
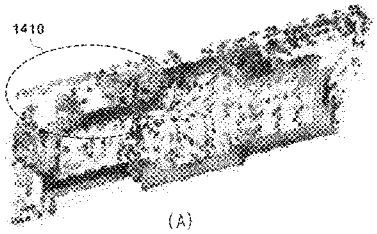
Figure 14B:
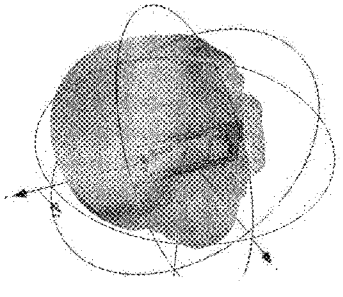
Figure 15:
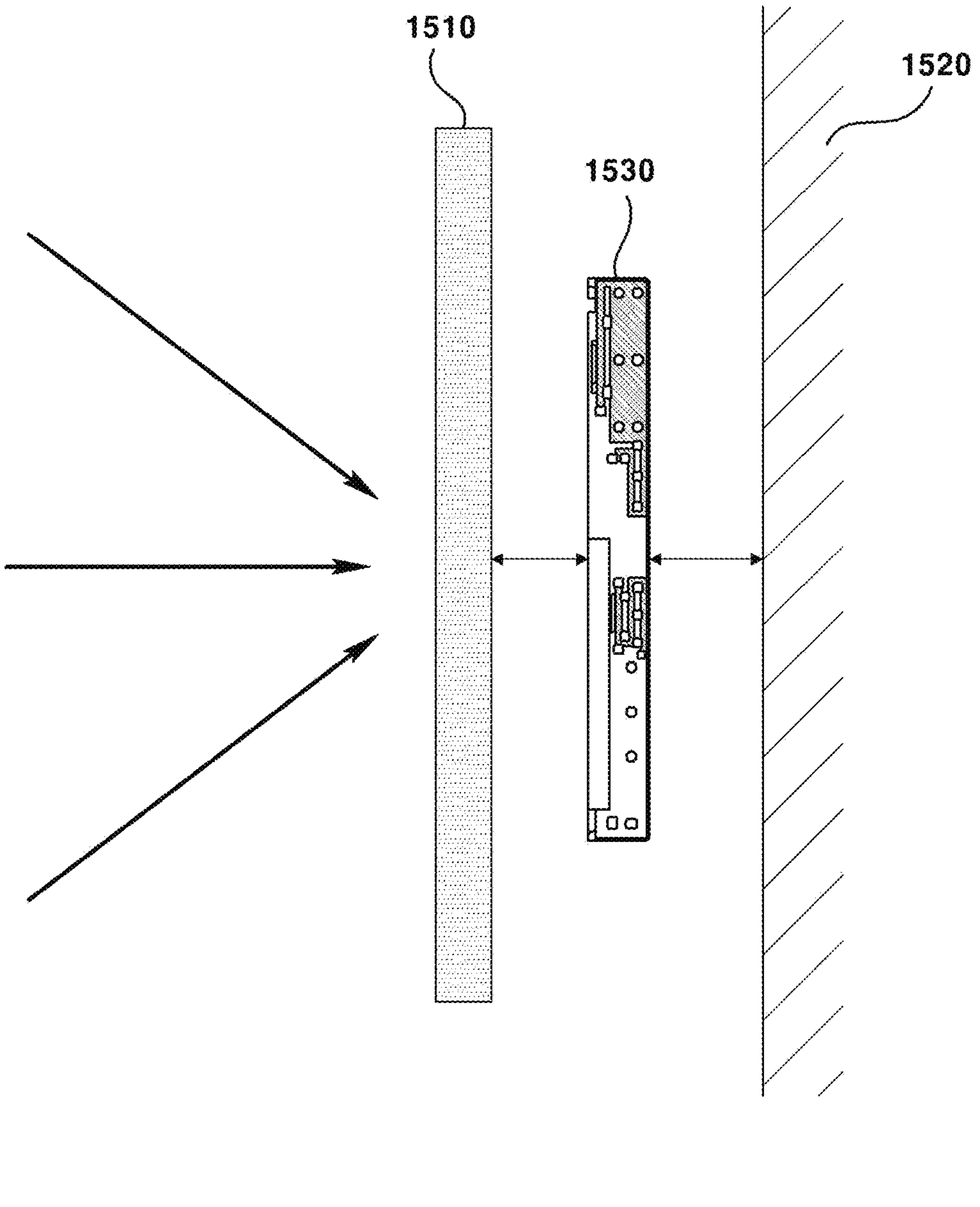
FIG. 15 is a diagram for explaining an example in which the antenna module is positioned between a metal plate and a wall according to an embodiment of the present invention.

FIG. 14*a* is a flow of current being measured at 5 GHz when a coupling antenna is not included, and it can be seen that a number of null points are generated in the radiation pattern due to the influence of the wall surface 1520, so that radiation is not performed well. In contrast, FIG. 14*b* is a flow of current being measured at 5 GHz when including the first coupling antenna and the second coupling antenna, and when compared to FIG. 14*a*, it can be seen that a current flow is formed in the side surface, that is, in the region 1410 where the coupling antenna is formed. That is, by inducing a radiation current in the coupling antenna by using a coupling antenna, it can be seen that the coupling antenna is radiated smoothly toward the front part (the space between the metal plate and the wall).

An electronic device according to an embodiment of the present invention comprises: a substrate; a first radiation part and a second radiation part being connected to the substrate through at least one feeder line, to which a current is applied; a bracket that covers the substrate; a first coupling radiation part being spaced apart from the first radiation part at a predetermined interval, being formed on at least one outer side surface of the bracket, and being coupled to the first radiation part; and a second coupling radiation part being spaced apart from the second radiation part at a predetermined interval, being formed on at least one outer side surface of the bracket, and being coupled to the second radiation part. A detailed description of an antenna module being comprised of a first radiation part, a second radiation part, a first coupling radiation part, and a second coupling radiation part being included in the electronic device according to an embodiment of the present invention corresponds to the detailed description of the antenna module 100 about FIGS. 1 to 15.

An electronic device according to an embodiment of the present invention is applicable to various types of devices having a communication function. For example, it is applicable to various devices including an antenna module, that is, a TV (especially a smart TV), a monitor, a PDA, a PC, a notebook computer, a mobile terminal, a smart terminal, a navigation device, and the like, and in addition, it is possible to apply to various types of devices including communication functions.

The electronic device enables communication even when the electronic device is placed in close contact with a wall or the like by directing the radiation direction of the signal in a direction that can be radiated by using a first radiation part, a second radiation part, a first coupling radiation part, and a second coupling radiation part. Through this, it is possible to implement a wall-mounted or wall-mounted smart TV. In addition, radiation degradation can be overcome by minimizing the effect of the rear distance between the metal plate and the antenna module, and radiation degradation can be overcome by minimizing the effect of distance from the concrete wall.

As described above, in the present invention, although it is described by specific matters such as specific components and limited embodiments and drawings, this is only provided to help a more general understanding of the present invention, and the present invention is not limited to the above embodiments, and various modifications and variations are possible from these descriptions by those of ordinary skill in the art to which the present invention belongs.

Therefore, the spirit of the present invention should not be limited to the described embodiments, and not only the claims to be described later, but also all those with equivalent or equivalent modifications to the claims will be said to belong to the scope of the spirit of the present invention.

The invention claimed is:

1. An antenna module comprising:

a first radiation part and a second radiation part configured to receive a current via at least one feeder line;

a first coupling radiation part coupled to the first radiation part while being spaced a predetermined distance apart from the first radiation part; and a second coupling radiation part coupled to the second radiation part and spaced apart from the second radiation part in a predetermined interval, wherein the first radiation part and the second radiation part radiate signals in different frequency bands, wherein the first coupling radiation part is formed as a first line patch having a first meander line shape, and wherein the second coupling radiation part comprises a quadrangular-shaped patch and a second line patch having a second meander shape.

2. The antenna module according to claim 1, wherein the first coupling radiation part and the second coupling radiation part are formed to face in one direction.

3. The antenna module according to claim 1, wherein a length of a radiation patch of the first radiation part is 17.5 to 17.7 mm.

4. The antenna module according to claim 1, wherein the first coupling radiation part or the second coupling radiation part is formed to have a length such that a level of isolation from between the first coupling radiation part and the second coupling radiation part is equal to or less than a predetermined value.

5. The antenna module according to claim 1, wherein one of the first radiation part and the second radiation part is a radiation part for Wi-Fi, and the other one is a radiation part for Bluetooth.

6. The antenna module according to claim 1, comprising:

a third radiation part configured to receive a current via the at least one feeder line, wherein the third radiation part is spaced apart from the first radiation part in a predetermined interval.

7. The antenna module according to claim 6, wherein a radiation patch of the third radiation part has a different lengthwise direction from a radiation patch of the first radiation part.

8. The antenna module according to claim 1, wherein the first radiation part and the second radiation part are formed on a substrate, and wherein the first coupling radiation part and the second coupling radiation part are formed on at least one outer side surface of a bracket covering the substrate.

9. The antenna module according to claim 1, wherein a length of a radiation patch of the second radiation part is 17.2 to 17.4 mm.

10. The antenna module according to claim 1, wherein the first radiation part is configured to cause resonance with the first coupling radiation part in at least one of a 2.4 to 2.5 GHz band or a 5.0 to 5.2 GHz band.

11. The antenna module according to claim 1, wherein the second radiation part is configured to cause resonance with the second coupling radiation part in a band of 2.4 to 2.5 GHz.

12. An antenna module comprising:

a first radiation part and a second radiation part configured to receive a current via at least one feeder line;

a first coupling radiation part coupled to the first radiation part while being spaced a predetermined distance apart from the first radiation part; and a second coupling radiation part coupled to the second radiation part and spaced apart from the second radiation part in a predetermined interval, wherein the first radiation part and the second radiation part radiate signals in different frequency bands, and wherein the second coupling radiation part comprises:

a square patch in a quadrangular shape;

a first line patch extended from one end of the square patch; and a second line patch extended from another end of the square patch.

13. The antenna module according to claim 12, wherein the square patch is formed to have a length of 21.6 to 21.8 mm and a width of 4.9 to 5.1 mm, wherein a length of the first line patch is 24.25 to 24.45 mm, and wherein a length of the second line patch is 18.75 to 18.95 mm.

14. The antenna module according to claim 12, wherein at least one of the first line patch and the second line patch is formed in a meander line shape.

15. An electronic device comprising:

a substrate;

a first radiation part and a second radiation part connected to the substrate via at least one feeder line and configured to receive a current;

a bracket covering the substrate;

a first coupling radiation part spaced apart from the first radiation part in a predetermined interval, formed on at least one outer side surface of the bracket, and coupled to the first radiation part; and a second coupling radiation part spaced apart from the second radiation part in a predetermined interval, formed on at least one outer side surface of the bracket, and coupled to the second radiation part, wherein the first coupling radiation part is formed as a first line patch having a first meander line shape, and wherein the second coupling radiation part comprises a quadrangular-shaped patch and a second line patch having a second meander shape.

16. The electronic device according to claim 15, wherein the first coupling radiation part and the second coupling radiation part are formed to face in one direction.

17. The electronic device according to claim 15, wherein the first line patch has a predetermined width, and wherein the second coupling radiation part comprises:

the second line patch extended from one end of the quadrangular-shaped patch; and a third line patch extended from another end of the quadrangular-shaped patch.

* * * * *